July 8, 1952  R. W. PARKER  2,602,198

DOME MOUNTING

Filed April 5, 1949

INVENTOR
Richard W. Parker
BY
Schmieding, Bottom and Huber
ATTORNEYS

Patented July 8, 1952

2,602,198

UNITED STATES PATENT OFFICE 2,602,198

DOME MOUNTING

Richard W. Parker, Springfield, Ohio, assignor to Parker Sweeper Company, a corporation of Ohio Application April 5, 1949, Serial No. 85,660

1 Claim. (Cl. 20—40)

This invention relates to a mounting means for securing a dome in position, and more particularly to releasably mounting an astral dome such as used by flight personnel for various observations, e. g. navigation or instrumentation in aircraft.

One of the objects of this invention is to provide means for mounting a navigator's dome, which can be operated manually to secure the dome in a pressure tight engagement with its supporting member, and which is also manually operated to release the dome for removing the same. The means used comprises in general a primary ring adapted to be secured in a hatchway or other opening in an aircraft cabin normally used for mounting a navigator's dome, and a secondary ring adapted to releasably engage with the primary ring and clamp the edges of the dome in a pressure tight engagement. This construction feature provides a safety mounting which facilitates a quick and easy removal of the dome from the hatchway for escape purposes, as well as for an economical replacement of the dome at regular intervals when its optical properties have become impaired.

Another object of the invention is to provide means for securing or releasing the dome from its mounting which can be operated manually by turning the secondary or inner ring in either a clockwise or counterclockwise direction. This feature enables a navigator, or other aircraft personnel, to remove the dome with a minimum of time in an emergency.

It is also an object to provide handle means which facilitates either mounting or removing the dome, and which is provided with a simple detent preventing an accidental or inadvertent releasing of the dome.

An additional object and feature resides in providing a mounting of the character described which includes a pair of rings having flanges forming supports for sealing members and between which the edges of the dome are clamped. The rings are provided with ribs adapted to engage when the rings are rotated to a predetermined aligned position. These ribs thus provide for releasably clamping the rings together and thereby holding the dome in the desired position. Furthermore, this construction facilitates manufacturing the rings to such close tolerances that when used with a sealing gasket, an air pressure, for example, of the order of about 13 pounds per square inch can be maintained on the dome within a minimum leakage requirement.

Further objects and advantages of the present invention will be apparent from the following description, reference being had to the accompanying drawings wherein a preferred form of embodiment of the invention is clearly shown.

Figures 3, 4:
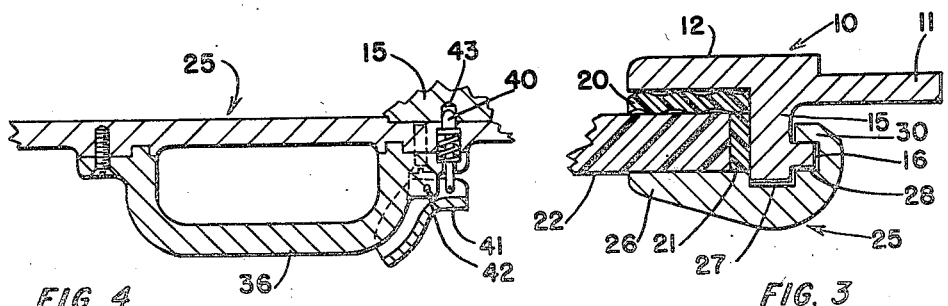
Fig. 3 is a broken, vertical sectional view through the top and bottom rings secured together.
Fig. 4 is a broken, vertical sectional view through one of the handles and the detent.
Figure 2:
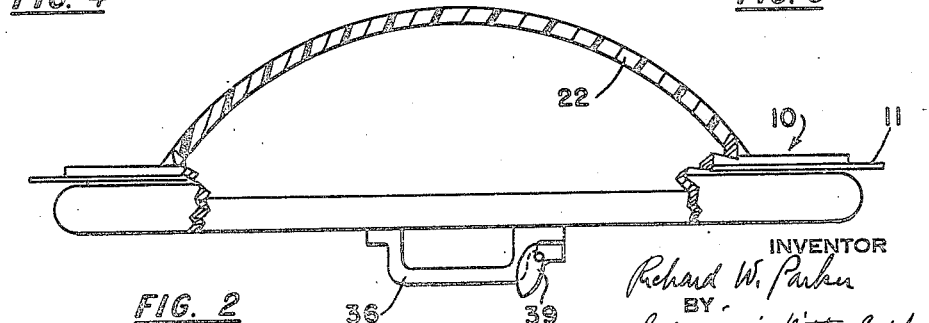
Fig. 2 is a side elevation view of the rings securing a navigator's dome in position, part of the dome and rings being broken away and illustrating one of the operating handles.

Referring further to the drawings, the mounting shown comprises in general a primary or outer ring 10 in the form of a circular fixture adapted to be permanently mounted. This ring is formed with a flange 11 adapted to be secured in a hatchway, or circular opening in the cabin or fuselage of an aircraft for receiving an observing dome, by screws or rivets (not shown) or other suitable means. The ring 10 is also provided with a flange 12 oppositely disposed from the flange 11 as seen in Fig. 3.

Figure 1:
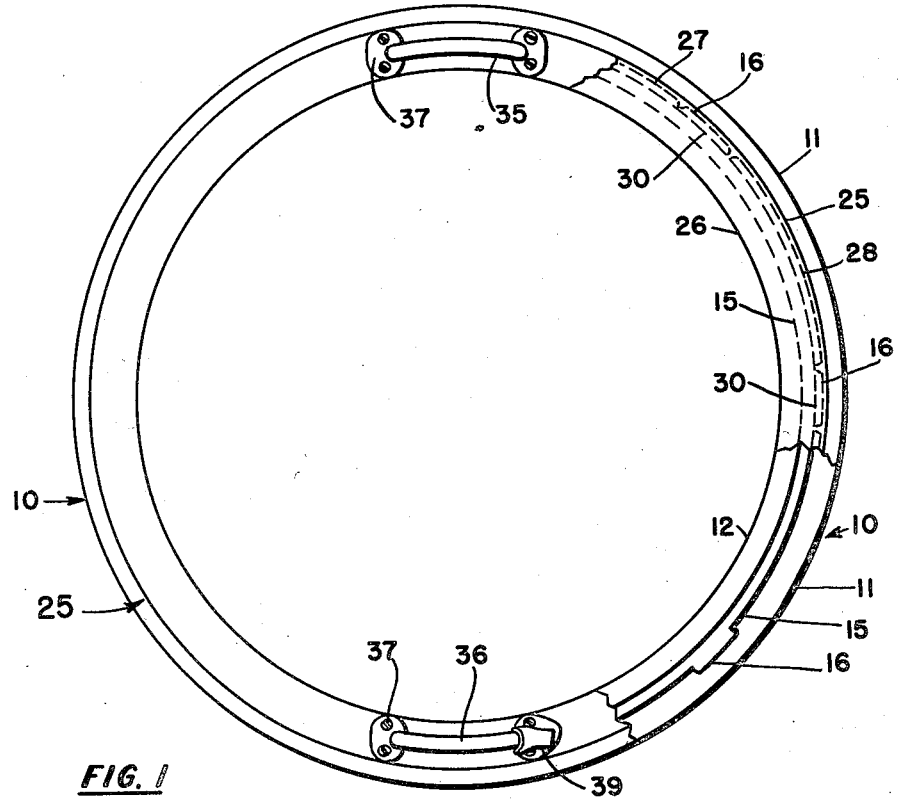
Fig. 1 is an elevational view as seen from the bottom or underside of the rings when clamped together, one part showing the secondary or inner ring broken completely away to illustrate the underside of the primary or outer ring, and another part showing the secondary or inner ring partially broken away to illustrate the manner in which the ribs engage to clamp the rings together.

There is a depending portion 15 extending from substantially the mid-portion of ring 10. This portion extends annularly around the ring. A plurality of ribs 16 project from the side of the depending portion 15 at regularly spaced intervals of about every 45 degrees around the ring, as indicated in Fig. 1. The flange 12 and depending portion 15 are formed at substantially right angles to each other and provide smooth, flat, inner surfaces for supporting the sealing members 20 and 21 in engagement with the edges of the dome 22. The sealing member 20, for example, is a plastic gasket having a corrugated surface configuration as shown in Fig. 3. The sealing member 21 can be a similarly formed gasket, or any other type of sealing means suitable for insulating against heat and cold and which provides a seal for retaining air under pressure when deformed.

The secondary or inner ring 25 is formed with a flange 26 which extends parallel to the flange 12. Ring 25 is also provided with a stepped recess as indicated at 27 and 28 into which the depending portion 15 and rib 16 extend when the rings 10 and 25 engage. A plurality of ribs 30 project inwardly from the upper edge of ring 25 and extend over the recess 27—28. These ribs extend annularly around the edge of ring 25 at regularly spaced intervals of about every 45 degrees, as indicated in Fig. 1. Thus, when the bottom ring 25 is positioned so that the depending portion 15 and rib 16 of ring 10 are received within the recess 27—28, ring 25 can be rotated relatively to ring 10 until the ribs 30 align in an engaging position with the ribs 16. Rotation in either a clockwise or counterclockwise direction brings the ribs 30 over the ribs 16. This locks the rings together and clamps the dome and sealing members between the flanges 12 and 26. To separate the rings and remove the dome, the ring 25 is rotated in either direction until the ribs 30 move out of alignment with the ribs 16. The ribs 30 are then aligned so as to extend over the recessed area indicated at 28, which permits ring 25 to be removed from ring 10.

Handle means 35 and 36 are carried on ring 25 by means of the brackets and screws indicated at 37. These handles are provided to facilitate rotating ring 25 relative to ring 10. A detent 39 is carried on one of the handles and engages with ring 10 to prevent the rotation of the rings after they are engaged. The detent 39 includes a spring-pressed pin 40 and a finger operating lever 41 pivotally connected to the handle, as indicated at 42 in Fig. 4. The pin 40 in its raised position is received in a bore 43 formed in the bottom of the depending portion 15. When the lever 41 is pressed down, as by the operator's thumb, for example, the pin 40 is retracted from the bore 43 and ring 25 can be freely turned by means of the handles 35 and 36.

From the above description it will be apparent that there is provided a mounting for releasably holding a navigator's observing dome, or the like, in an upright position. This mounting also provides for holding the dome and sealing the edges to prevent the loss of air under pressure in an aircraft designed for high altitude flying. The mounting further provides for a quick and easy removal of the dome in cases of emergency, or when the optical properties of the dome have become impaired and require replacement of the dome.

While the form of embodiment of the present invention as herein disclosed constitutes a preferred form, it is to be understood that other forms might be adopted, all coming within the scope of the claim which follows.

I claim:

A mounting for releasably holding a circular dome in a secured position comprising, in combination, a ring having a circular portion adapted to surround the periphery of the dome, and having a circular, inwardly extending flange forming a circular clamping seat for a side face of the dome and having a plurality of radially, outwardly extending ribs spaced circumferentially from one another, a second ring forming a clamping seat, confronting the first mentioned seat, for the opposite side face of the dome and arranged longitudinally, concentrically with the first ring, the second ring having a portion longitudinally overlying said circular portion of the first mentioned ring and having a portion peripherially overlying the ribs of the first mentioned ring and having radially, inwardly extending ribs spaced circumferentially from one another, and correspondingly with the spacing of the ribs on the first mentioned ring, the ribs of the rings overlying one another in hooked relationship, the circumferential distances between adjacent ribs of one of the rings being each greater than the circumferential length, respectively, of each of the ribs of the other ring.

RICHARD W. PARKER.

REFERENCES CITED

The following references are of record in the file of this patent:

UNITED STATES PATENTS

| Number | Name | Date |
|---|---|---|
| 406,246 | Wacker | July 2, 1889 |
| 631,292 | Fyfe et al. | Aug. 22, 1899 |
| 1,727,595 | Gustafson | Sept. 10, 1929 |
| 2,178,392 | Elfstrom | Oct. 31, 1939 |
| 2,258,724 | Wagner et al. | Oct. 14, 1941 |

FOREIGN PATENTS

| Number | Country | Date |
|---|---|---|
| 12,673 | Great Britain | 1849 |
| 671,250 | France | 1929 |